United States Patent [19]

Lawrence

[11] 4,065,892
[45] Jan. 3, 1978

[54] REMOVABLE LOW LEVEL BUILDING CARRIER

[76] Inventor: Robert Raymond Lawrence, 205 W. Fifth St., Alturas, Calif. 96101

[21] Appl. No.: 722,883

[22] Filed: Sept. 13, 1976

[51] Int. Cl.² .............................................. E04B 1/343
[52] U.S. Cl. .................................. 52/143; 280/81 R; 280/405 R
[58] Field of Search ....................... 52/143, 79.7, 79.8; 280/30, 404, 81 R

[56] References Cited

U.S. PATENT DOCUMENTS

| 2,287,229 | 6/1942 | Carpenter | 52/79.8 X |
| 3,254,914 | 6/1966 | Steck | 280/81 R |
| 3,697,098 | 10/1972 | Fisher | 52/143 X |
| 3,765,714 | 10/1973 | Lau | 52/143 X |
| 3,834,111 | 9/1974 | Acker et al. | 52/143 X |
| 3,944,242 | 3/1976 | Eubank | 52/143 X |

FOREIGN PATENT DOCUMENTS

| 405,949 | 7/1966 | Switzerland | 280/30 |

Primary Examiner—Alfred C. Perham

[57] ABSTRACT

A light weight steel dolly connection plate on either side of two, three or more running gear dollies connect these individual dollies together and the dolly connection plate connects to the wood frame prefabricated building at the floor level thus forming the low level building carrier. Each dolly contains a single axle running gear. The flat steel dolly connection plate distributes the concentrated load to the all wood prefabricated building "box" without over stress. The individual dollies utilize conventional mobile home type running gear and are constructed of relatively light weight compact structural steel sections. The low level building carrier, over the distance of its contact and connection to the building floor, forms a very stiff "carrying bed" section adequately strong to support sections of the building which have reduced strength such as side walls containing door openings, etc. By increasing the number of dollies or the distance between individual dollies, measured along the longitudinal length of the building, the effective length of the stiffened carrying bed may be increased to provide adequate support for all sections of opening weakened wall which characterizes a given building floor plan.

1 Claim, 6 Drawing Figures

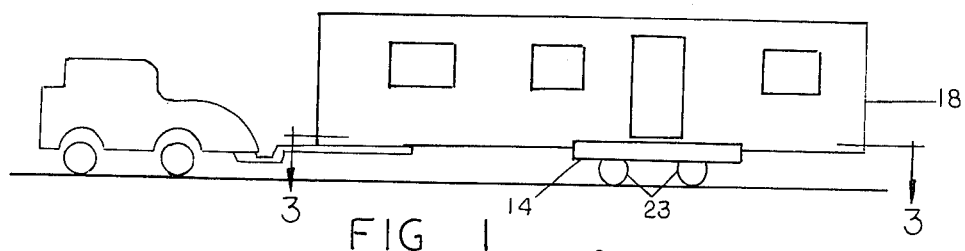
FIG 1
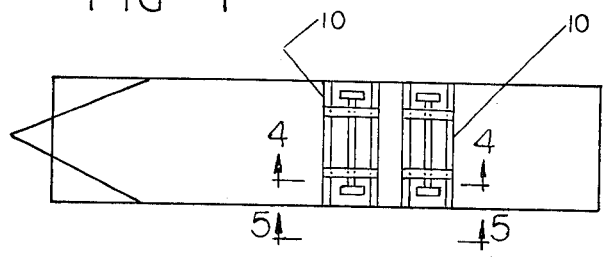
FIG 2
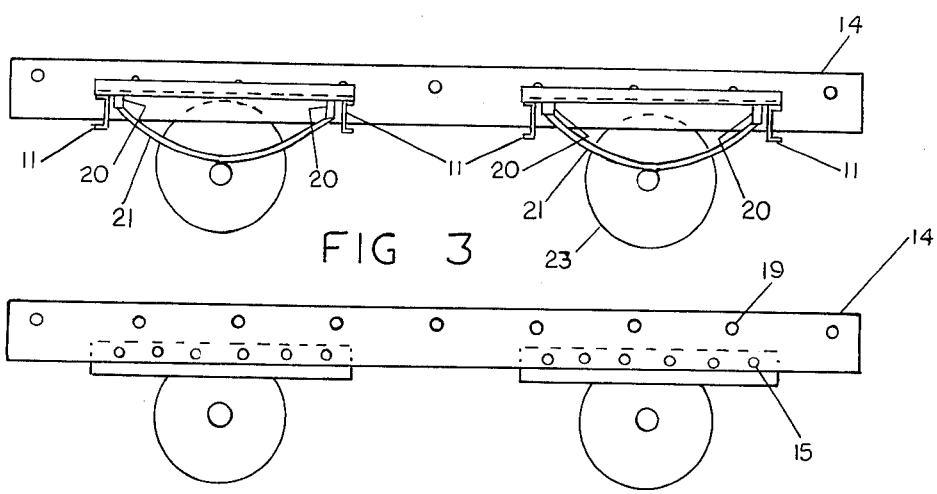
FIG 3
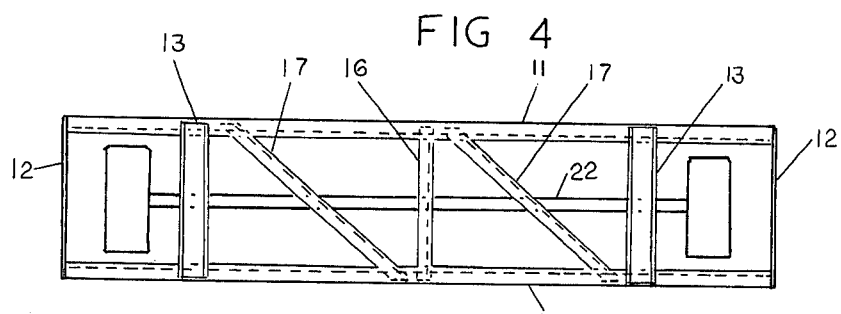
FIG 4
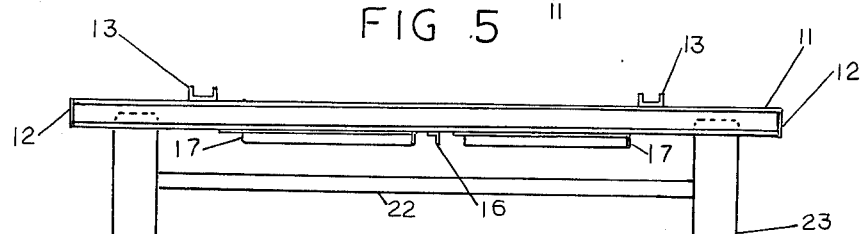
FIG 5
FIG 6

REMOVABLE LOW LEVEL BUILDING CARRIER

The prefabricated transportable building, at the present time, appears to fall within only two major groups (a) the modular home or building and (b) the mobile home. Basically, the modular building is constructed without an underlying steel frame or chassis and is transported on a heavy flat trailer to the erection site where it is lifted, rolled or skidded to a permanent foundation. On the other hand, the mobile home being usually of lighter construction is assembled upon a continuous steel frame or chassis which incorporates running gear and a towing "A" frame all of which has utility only for the brief 'transportation phase' of the building's economic life. Current statistics indicate that only smaller single width mobile homes are likely to be relocated after initial erection and therefore the continuous steel chassis and often the running gear and "A" frame are in effect abandoned underneath the building never again to serve the purpose for which they were provided. In the case of the modular building, the heavy transport and siting equipment represents a sizeable investment which must be considered economically wasteful, provided that there is a feasible alternate. This invention, in concert with attendant patent applications (1) Ser. No. 722,882 filed Sept. 13, 1976 Prefabricated Transportable Building Without Continuous Steel Frame and (2) Ser. No. 722,884 filed Sept. 13, 1976, Removable "A" Frame For Prefabricated Building Transport, originates a product combination to avoid the problem of abandoning steel chassis under mobile homes and the expense involved in heavy equipment associated with modular homes. The removable low level building carrier of this invention is easily attached to, and is easily removable from, the prefabricated building. The latter building carrier utilizes the inherent diaphragm stiffness of the building floor to laterally support the dolly connection plates connected along each side of the floor thus gaining relatively high flexural strength from these plates and from the secure connection to the building rim joist which is carefully designed to facilitate the system herein. Portions of the building which do not overlie the stiffened section provided by the low level building carrier that must have sufficient strength and stiffness to cantilever span at the rear of the building and simple support span at the front of the building e.g. between the stiffened section provided by the low level building carrier and the stiffened section provided by the towing "A" frame. Attainment of this strength is a part of patent application "Prefabricated Building Without Continuous Steel Chassis".

For the purpose of illustrating the invention there is shown in the drawings a form which is presently preferred; it being understood, however, that this invention is not limited to the precise arrangements and instrumentalities shown.

FIG. 1 is a side elevation view of a prefabricated building and pulling tractor

FIG. 2 is a cross sectional plan view taken along line 3—3 in FIG. 1

FIG. 3 is a side elevation sectional view taken along line 4—4 in FIG. 2

FIG. 4 is a side elevation view taken along line 5—5 in FIG. 2

FIG. 5 is a plan view of braced steel dolly frame

FIG. 6 is a side elevation view of braced steel dolly frame

Referring to the drawings, a preferred embodiment of this invention is illustrated which, in general, includes a specially designed low level building carrier which contains two braced steel dolly frames 10 in the preferred embodiment. Each of these frames 10 has two identical elongated longitudinal members 11 on either side which run transverse to the long dimension of the prefabricated building and are interconnected on either end with identical end plates 12 and identical cross members 13. End plates 12 serve to connect the individual dolly frames 10 to removable dolly connection plate 14. Plates 12 and 14 lie flat against one another in the assembly and are bolted together by bolts 15. Cross bracing members 16 and 17 also interconnect members 11 together. Removable dolly connection plate 14 connects to the prefabricated building "box" which lies above it by lag bolts or bolts 19, or equal. Members 13 connect to spring hangers 20 which, in turn, connect to leaf springs 21 which connect to axles 22 which support wheels 23. Members comprising braced steel dolly frame 10 may be interconnected by welding, bolts or rivets or any combination, or equal and are sized according to load carrying capacity that is desired. Ease of installation and removal are key features of this invention and accordingly, the complete dolly frames 10 can be individually installed or removed by bolts 15 which are ten in number in the preferred embodiment. Similarly, the entire low level building carrier may be installed, as one piece, by bolts 19 which are 18 in number in the preferred embodiment or the individual dolly connection plates 14 may be installed or removed separately by bolts 19. Cross members 13 transmit the load from longitudinal members 11 to spring hangers 20 and are therefore highly stressed. In the preferred embodiment these members 13 lie flat against the top flanges of side members 11 which, in effect, lowers the carried load but may require wheel wells into the bottom of the building floor. An alternate to this is to shorten and lower members 13 so they do not lap over the flanges of members 11 but abutt the webs of members 11 instead and are connected thereto by welding or the equivalent. Using this alternate wheel wells may be avoided but height of the carried load is increased. Utilization of the weak axis strength of cross members 13, as in the preferred embodiment, is accomplished by arranging dolly frame 10 members so that the spring hanger 21 reactions fall very close to the point of connection between members 11 and 13 thus subjecting members 13 to shear stress rather than flexure stress. The spacing, center to cente, of dolly frames 10 along dolly connection plate 14 is important and may be adjusted to meet requirements sought. This spacing will vary depending upon load to be carried, the number of axles 22 per low level building carrier assembly and the "wheel scrubbing" during turning that is tolerable.

Although a preferred embodiment of this invention has been shown and described, this invention is not meant to be limited thereto but is intended to embody all forms and modifications within the spirit of the following claims.

I claim:

1. In combination, a prefabricated building and a low level building carrier comprising
    a. a prefabricated building having an elongated body and which is structurally suitable for being transported upon said low level building carrier along a line parallel to the longitudinal axis of said building, b. a low level building carrier lying beneath said prefabricated building, having ground engaging wheeled running gear for moving said building along a line parallel to the longitudinal axis of said building and comprising,
 1. two longitudinally elongated flat dolly connection plates of equal length, parallel to one another and separated by a distance substantially equal to the width of said prefabricated building,
 2. braced steel dolly frame including ground support wheels and comprising
   a. two identical longitudinal elongated side members horizontally disposed lying transverse to the longitudinal axis of said prefabricated building,
   b. two identical longitudinal elongated end nenbers horizontally disposed lying parallel to the longitudinal axis of said prefabricated building, of length substantially less than said side members,
   c. two identical longitudinally elongated cross members horizontally disposed, extending between said side members, of length substantially equal to said end members and lying parallel said end members,
   d. means of bracing said side members in their parallel relationship with one another, said means including one or more horizontally disposed braces lying at substantially right angles to said side members and also including one or more horizontally disposed diagonal braces, all of latter said braces being longitudinally elongated members connecting to said side members by welding, bolts, rivets or the equivalent,
   e. means of connecting said cross members to ground engaging wheeled running gear spring hangers, such means being by welding or the equivalent,
   f. means of connecting said dolly connection plates to said end members said means being by bolts engaging both said end plates and said dolly connection plate in a relationship placing said end members and said dolly connection plates flat against one another,
   g. means of connecting said dolly connection plate to said prefabricated building such means being by lag screws or bolts engaging both said dolly connection plate and said prefabricated building when flat against one another.

* * * * *